(12) United States Patent
Wilkes et al.

(10) Patent No.: US 6,604,489 B2
(45) Date of Patent: *Aug. 12, 2003

(54) ANIMAL TRAINING DEVICE

(76) Inventors: Gary M. Wilkes, 2344 E. Alpine Ave., Mesa, AZ (US) 85240; Michele C. Wilkes, 2344 E. Alpine Ave., Mesa, AZ (US) 85240

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,359

(22) Filed: Nov. 17, 1999

(65) Prior Publication Data

US 2002/0053323 A1 May 9, 2002

(51) Int. Cl.[7] ............................................. A01K 15/00
(52) U.S. Cl. ..................... 119/712; 119/705; 119/707
(58) Field of Search ................. 119/712, 707, 119/702; D30/160; D21/399, 412; 446/396, 325, 326

(56) References Cited

U.S. PATENT DOCUMENTS

| | | | |
|---|---|---|---|
| 712,786 A | | 11/1902 | Flint |
| 745,806 A | | 1/1903 | Erb, Jr. |
| 790,660 A | | 5/1905 | Prior |
| 907,092 A | | 12/1908 | Schoenhut |
| 1,020,367 A | * | 3/1912 | Patterson, Jr. |
| 1,425,945 A | * | 8/1922 | Congdon, Jr. |
| 2,585,780 A | | 2/1952 | Johnson |
| 2,833,244 A | | 5/1958 | Bohlman |
| 3,442,045 A | * | 5/1969 | Green ........................ 46/118 |
| 3,584,604 A | * | 6/1971 | Wegner ..................... 119/705 |
| 3,805,444 A | | 4/1974 | Adickes |
| 4,854,587 A | * | 8/1989 | Groves ..................... 273/26 R |
| 4,907,537 A | | 3/1990 | Shirk |
| 5,169,354 A | | 12/1992 | Norton et al. |
| D338,987 S | * | 8/1993 | Eroyan ..................... D30/160 |
| 5,322,036 A | * | 6/1994 | Merino ...................... 119/707 |
| 5,813,366 A | * | 9/1998 | Mauldin, Jr. ................ 119/710 |
| D411,042 S | * | 6/1999 | Willinger ................... D30/160 |
| D411,357 S | | 6/1999 | Baiera et al. |
| D412,767 S | | 8/1999 | Bemis et al. |
| 6,016,771 A | * | 1/2000 | Baiera et al. ............... 119/708 |
| D426,036 S | * | 5/2000 | Willinger et al. ........... D30/160 |
| 6,109,213 A | * | 8/2000 | Rebalko .................... 119/422 |

* cited by examiner

*Primary Examiner*—Charles T. Jordan
*Assistant Examiner*—Kimberly S. Smith
(74) *Attorney, Agent, or Firm*—Quarles & Brady Streichlang LLP; Robert D. Atkins, Esq.

(57) ABSTRACT

An animal training device is disclosed. The training device includes a target section and a base section coupled together. The base section includes a top portion and a rounded bottom portion. An annular flange is located between the top portion and the bottom portion and extends outward from the top portion and bottom portion. The annular flange is operable to ensure that excessive exterior forces do not knock over the training device. The training device is portable as well as self-righting.

10 Claims, 3 Drawing Sheets

ANIMAL TRAINING DEVICE

TECHNICAL FIELD OF THE INVENTION

This invention relates to the field of animal training and; more particularly, to an animal training device.

BACKGROUND

According to the American Veterinarian Association, there are more than fifty-two million dogs in this country. The majority of these dogs are owned by pet owners that endeavor at some point to train their dogs or hire someone to train their dogs. However, since prehistoric man first domesticated the canine, little has changed in the way dogs are trained. Dog training is still dominated by the belief that force is needed to bend or break the will of the dog.

Recently, there has been movement toward a more humane way of training dogs. Using reinforcements in the form of treats, verbal praise or play, a dog can learn to associate a proper behavior with an external reinforcement. In a teaching methodology disclosed in the booklet and video "CLICK AND TREAT Training Kit Version 1.1/1.2" by Gary Wilkes, a training clicker is used as an external stimulus. The clicker is used as a learning formation tool in order for the animal to associate the correct behavior with a beneficial consequence. Later, verbal praise can replace the clicker. To teach more complex behaviors using this method, a dog can be taught to associate a targeting stick with the reinforcements and the external stimulus. In this manner, behaviors such as heeling can be taught.

A common behavior that a dog learns is a "go-out". In this behavior, a dog makes a controlled movement from a first point to a second point. The spot the dog needs to go to is usually far enough away that the basic click and treat with a targeting stick cannot be used to teach the behavior. What is needed is a dog training device that can be used to teach a go-out and similar behavior efficiently and easily.

SUMMARY OF THE INVENTION

Accordingly, it may be appreciated that a need has arisen for an animal training device. In accordance with the teachings of the present invention, an animal training device is disclosed which provides substantial advantages.

In one embodiment of the present invention, an animal training device is disclosed. The training device includes a target section and a base section coupled together. The base section includes a top portion and a rounded bottom portion. An annular flange is located between the top portion and the bottom portion and extends outward from the top portion and bottom portion. The annular flange is operable to ensure that excessive exterior forces do not knock over the training device. The training device is portable as well as self-righting.

The present invention provides various technical advantages. For example, one technical advantage is a dog training device that cannot be tipped over is disclosed. Additionally, the dog training device is portable and can be used indoors and out. Other technical advantages will be readily apparent to one skilled in the art from the following figures, descriptions and claims.

BRIEF DESCRIPTION OF THE DRAWINGS

For a more complete understanding of the present invention and the advantages thereof, reference is now made to the following description taken in conjunction with the accompanying figures, in which like reference numbers represent like parts and in which.

DETAILED DESCRIPTION OF THE INVENTION

Figure 1:
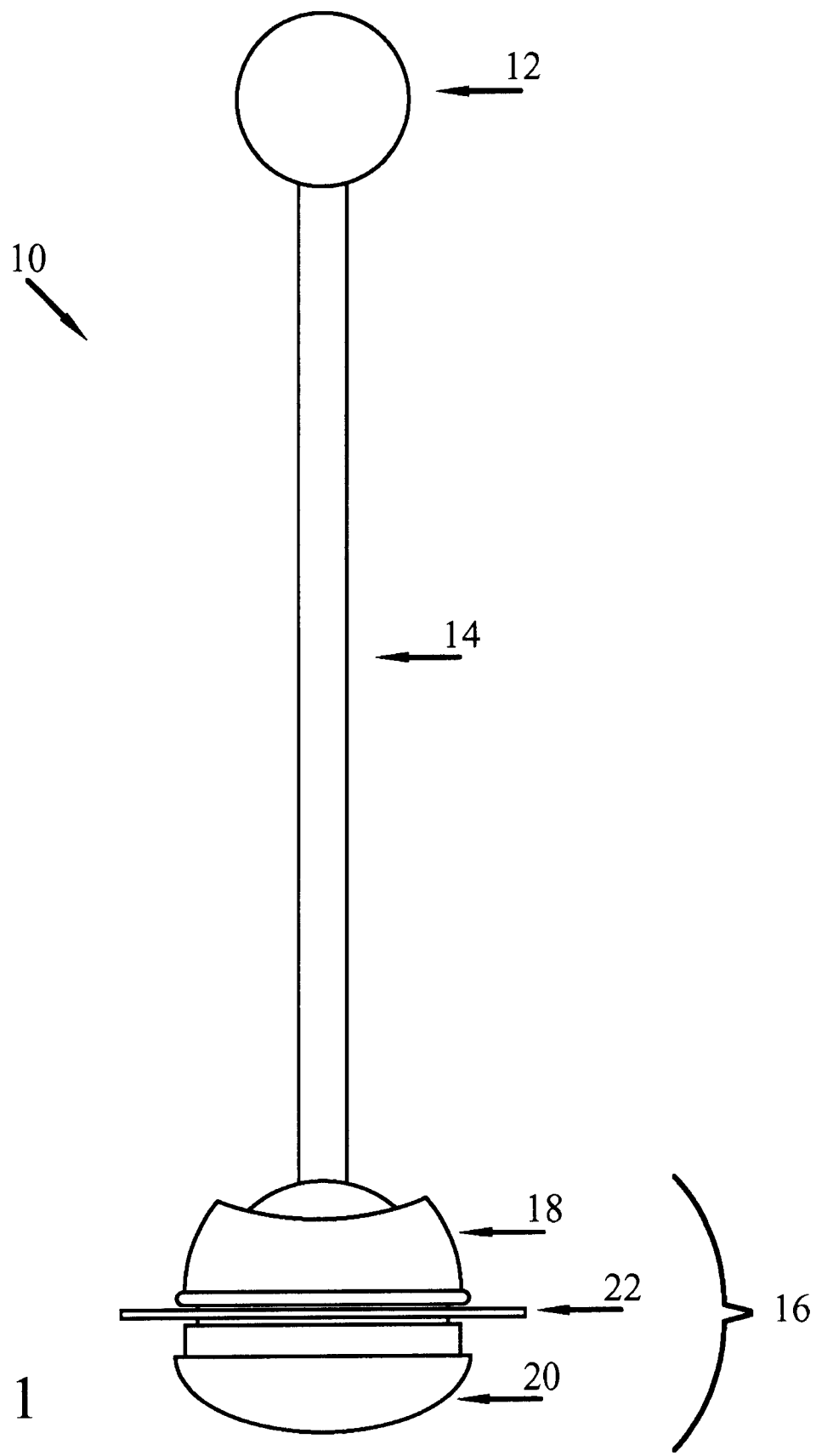
FIG. 1 illustrates a dog training device in accordance with the teachings of the present invention.

FIG. 1 illustrates an animal training device 10 in accordance with the teachings of the present invention. Device 10 comprises a target section 12 which attaches to a bottom section 16 via a rod 14. Bottom section 16 comprises a rounded bottom portion 20 attached to a top portion 18. In approximately the middle is a flange 22.

Target section 12, in one embodiment, is a spherical section and can be manufactured from plastic, rubber, foam, or other suitable materials. Rod 14 can be any rigid connector which will transfer motion of target section 12 to bottom section 16.

Rounded bottom portion 20 of bottom section 16 allows for device 10 to stand upright and vertical in presentation when initially placed and to rapidly return to a vertical position when subjected to outside forces, such as a dog hitting target section 12. The self-righting nature of device 10 allows for the target to be set in one spot and to have multiple dog/device interactions without the need of resetting the device. In one embodiment, rounded bottom portion 20 has a flat-bottomed hemispherical shape which preserves the vertical nature of the target. That is, in one embodiment, rounded bottom portion 20 has a flat bottom for contact a surface with rounded sides, similar to a bowl. Bottom portion 20 is also weighted for stability. The exact shape of bottom portion 20 is not important as long as it allows device 10 to rock when target section 12 or rod 14 are displaced and then return to a stable, upright position. Bottom portion 20 can be manufactured from steel, heavy plastic or other suitable material with steel, lead or other heavy material used as the counterweight.

Top portion 18 is, in one embodiment, essentially hemispherical in shape, although any shape can be used. Top portion 18 is designed to receive rod 14 and attach to bottom portion 20. Top portion 18 is typically manufactured from similar material as bottom portion 20, such as steel, aluminum, hard plastic and other suitable materials.

Flange 22 is located between top portion 18 and bottom portion 20 and extends outwardly from top and bottom portion 18 and 20. Flange 22, in one embodiment, is made from a material such as rubber. Other materials can also be used as long as flange 22 primary function, providing a contact surface (which helps to shift the center of gravity of device 10) to prevent device 10 from falling over, is achieved.

Figure 2:
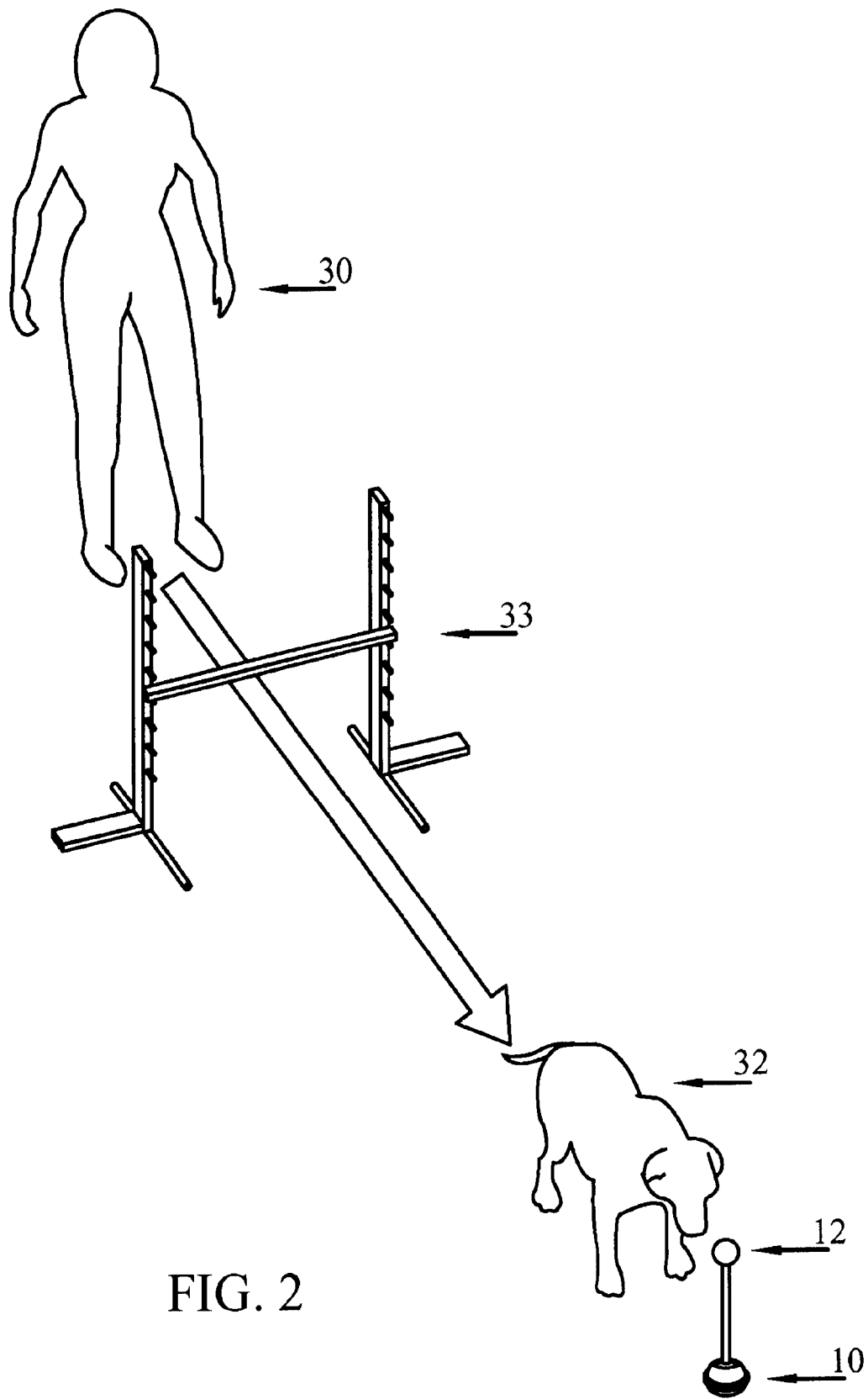
FIG. 2 illustrates the use of the device to train a dog.

FIG. 2 illustrates the use of device 10 in training a dog. Illustrated is a trainer 30, a dog 32 and device 10. Dog 32 is taught to associate touching target area 12 of device 10 with a reinforcement such as a treat, play, physical affection or verbal praise. Of course, to receive the reinforcement, dog 32 must return to trainer 30. If the behavior is properly performed, a training clicker can be used to indicate this, thus attaching an external stimulus to the proper behavior. Then to receive a subsequent treat the dog must go out to device 10 again. By increasing the distance between the trainer 30 and device 10, dog 32 will learn how to go out and come back. After that behavior is learned, jumps or other obstacles 33 could be placed between the device 10 and trainer 30. In this way, dog 32 can be taught to associate signals with directed movements. Dog 32 can also be taught to move a particular distance and/or direction to search for and/or discover or fetch objects.

Note that device 10 and target area 12 are designed to attract the dog's attention. It is also designed to be self righting so that dog 32 can hit the target device with its muzzle or paw and device 10 will rock but not fall over. This ensures continued training without the need for trainer 30 to repeatedly fix targets. Flange 22 provides extra assurance that device 10 will not fall over by providing a contact area and by helping to shift the center of gravity of device 10 to ensure its return to an upright position. Additionally, device 10 is portable and can be used both indoors and outdoors on any surface (except deep liquids). Device 10, unlike some conventional dog training aids, does not need to have an edible substance such as liver placed on it to get the animal to come to the aid. Instead, the animal associates the reinforcement and external stimulus with device 10 and provides the proper behavior.

Figure 3:
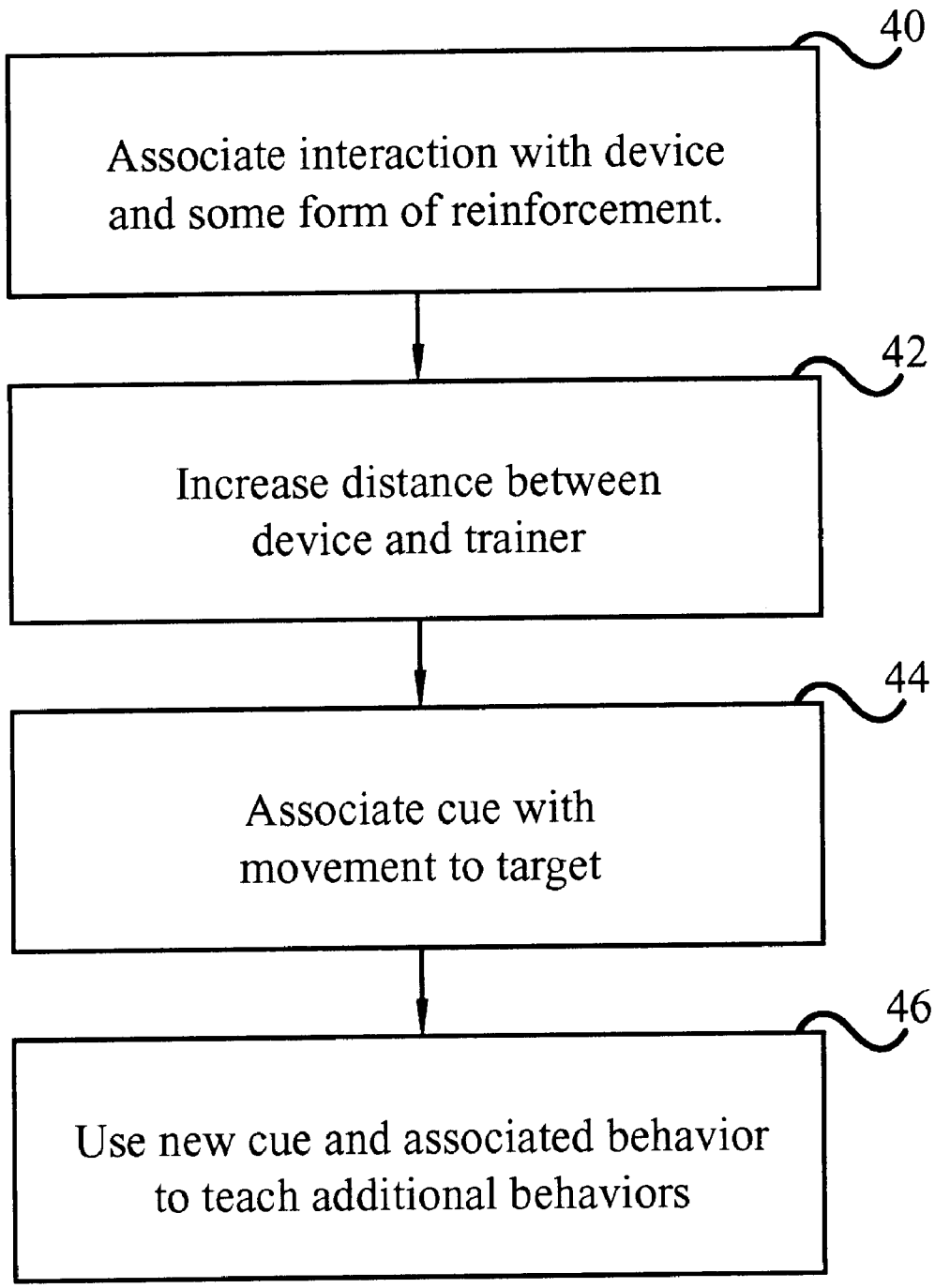
FIG. 3 is a flowchart illustrating the use of the present invention.

FIG. 3 is a flowchart which outlines a method for using device 10 for training an animal, such as a dog. In step 40, the dog is taught to associate touching device 10 with an external stimulus such as a click from a training clicker or verbal praise. One way of doing this is disclosed in the booklet and video entitled "CLICK AND TREAT Training Kit Version 1.1/1.2" by Gary Wilkes. After the dog has mastered the behavior of touching device 10, more complexities can be added.

In step 42, the trainer begins to move away from device 10. This requires the dog to go from the trainer, to device 10, and back to the trainer either immediately or on a command (based on the behavior the dog is learning). Eventually, a verbal command is attached to the behavior after the dog has mastered the behavior, in step 44. Additional behavior such as jumping over obstacles can be added to the behavior by adding jumps between the trainer and device. Also, a dog can be taught to move in a particular fashion in a particular direction or manner.

Although the present invention has been described for use with dogs, other animals can also be trained using this device, as is apparent to those skilled in the art. Additionally, although certain behaviors have been highlighted, additional behaviors can be learned utilizing device 10 as disclosed here within.

What is claimed is:

1. An apparatus for use in training of an animal, comprising:
   self-righting training means including,
   (a) weighted base means for supporting the self-righting training means, the weighted base means having a top portion and a rounded bottom portion and further having a rubber flange extending around the weighted base means between the top portion and the rounded bottom portion to cause the self-righting training means to self-return to an upright position,
   (b) a rod having a first end coupled to the top portion of the weighted base means, and
   (c) target means coupled to a second end of the rod, wherein if the self-righting training means is tipped then the weighted base means causes the self-righting training means to self-return to the upright position;
   stimulus means for causing an animal to return from the self-righting training means; and
   means for imposing an obstacle for the animal between the stimulus means and the self-righting training means whereby the animal navigates the obstacle and strikes the self-righting training means and returns in response to the stimulus means which reinforces desired behavior.

2. An animal training system, comprising:
   a self-righting training device including,
   (a) a weighted base having a top portion and a rounded bottom portion and further having a rubber flange extending around the weighted base between the top portion and the rounded bottom portion to cause the self-righting training device to self-return to an upright position,
   (b) a rod having a first end coupled to the top portion of the weighted base, and
   (c) a target section coupled to a second end of the rod, wherein if the self-righting training device is tipped then the weighted base causes the self-righting training device to self-return to the upright position;
   a stimulus for causing an animal to return from the self-righting training device; and
   an obstacle positioned between the stimulus and the self-righting training device, wherein the animal navigates the obstacle and strikes the self-righting training device and returns in response to the stimulus which reinforces desired behavior.

3. The animal training system of claim 2, wherein the rubber flange is circular.

4. The animal training system of claim 2, wherein the target section is spherical.

5. A self-righting training device, comprising:
   a weighted base having a top portion and a rounded bottom portion and further having a rubber flange extending around the weighted base between the top portion and the rounded bottom portion to cause the self-righting training device to self-return to an upright position;
   a rod having a first end coupled to the top portion of the weighted base; and
   a target section coupled to a second end of the rod, wherein the weighted base causes the self-righting training device to self-return to the upright position if the self-righting training device is tipped.

6. A self-right training device of claim 5, wherein the rubber flange is located at a midpoint between the top portion and the rounded bottom portion of the weighted base.

7. The self-right training device of claim 5, wherein the rubber flange is circular.

8. The self-right training device of claim 5, wherein the target section is spherical.

9. The self-right training device of claim 5, further including a stimulus for causing an animal to return from the self-righting training device.

10. The self-right training device of claim 9, further including an obstacle positioned between the stimulus and the self-righting training device, wherein an animal navigates the obstacle and strikes the self-righting training device and returns in response to the stimulus which reinforces desired behavior.

* * * * *